(12) United States Patent
Ogata et al.

(10) Patent No.: US 10,326,392 B2
(45) Date of Patent: Jun. 18, 2019

(54) MOTOR CONTROL DEVICE

(71) Applicant: DENSO CORPORATION, Kariya, Aichi-pref. (JP)

(72) Inventors: Rei Ogata, Kariya (JP); Junichi Ogoshi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 4 days.

(21) Appl. No.: 15/377,818

(22) Filed: Dec. 13, 2016

(65) Prior Publication Data

US 2017/0179862 A1    Jun. 22, 2017

(30) Foreign Application Priority Data

Dec. 17, 2015  (JP) ................. 2015-246262

(51) Int. Cl.
  *H02P 1/00*    (2006.01)
  *H02K 11/33*   (2016.01)
  *B62D 5/04*    (2006.01)
  *H02P 29/024*  (2016.01)
  *H02P 7/03*    (2016.01)

(52) U.S. Cl.
  CPC .............. *H02P 7/04* (2016.02); *B62D 5/0463* (2013.01); *H02K 11/33* (2016.01); *H02P 29/024* (2013.01)

(58) Field of Classification Search
  CPC ................... H02P 8/12; B62D 5/0463
  USPC ....................................... 318/400.1
  See application file for complete search history.

(56) References Cited

U.S. PATENT DOCUMENTS

| 2003/0121716 | A1  | 7/2003 | Yamada et al. |           |
|--------------|-----|--------|---------------|-----------|
| 2006/0069481 | A1* | 3/2006 | Kubota        | B62D 5/0463 |
|              |     |        |               | 701/41    |
| 2008/0048598 | A1* | 2/2008 | Shibuya       | H02P 6/185 |
|              |     |        |               | 318/400.1 |
| 2008/0067960 | A1  | 3/2008 | Maeda         |           |
| 2009/0128071 | A1* | 5/2009 | Brown         | H02P 6/182 |
|              |     |        |               | 318/400.13 |
| 2010/0044146 | A1  | 2/2010 | Kasai         |           |
| 2010/0079095 | A1* | 4/2010 | Shibata       | B62D 5/0484 |
|              |     |        |               | 318/474   |

(Continued)

FOREIGN PATENT DOCUMENTS

JP    2000289639 A    10/2000

*Primary Examiner* — Eduardo Colon Santana
*Assistant Examiner* — Cortez M Cook
(74) *Attorney, Agent, or Firm* — Knobbe, Martens, Olson & Bear, LLP

(57) ABSTRACT

A terminal voltage detection circuit of a motor control device detects first detection values of a first terminal of a DC motor and second detection values of a second terminal of the DC motor. An inter-terminal voltage calculation unit calculates inter-terminal voltage calculation values from the first detection values and the second detection values. The inter-terminal voltage calculation unit outputs one of the calculation values having the smallest absolute value as an inter-terminal voltage selection value. A steering angle speed estimation unit estimates a steering angle speed based on the selection value and a motor current. A compensation control unit executes a compensation control based on the steering angle speed estimated by the steering angle speed estimation unit. Accordingly, robustness of the compensation control is improved and excess assist is restricted.

5 Claims, 12 Drawing Sheets

(56) References Cited

U.S. PATENT DOCUMENTS

2015/0123591 A1* 5/2015 Inoue ..................... H02P 8/12
318/696

* cited by examiner

FIG. 10 COMPARATIVE EXAMPLE
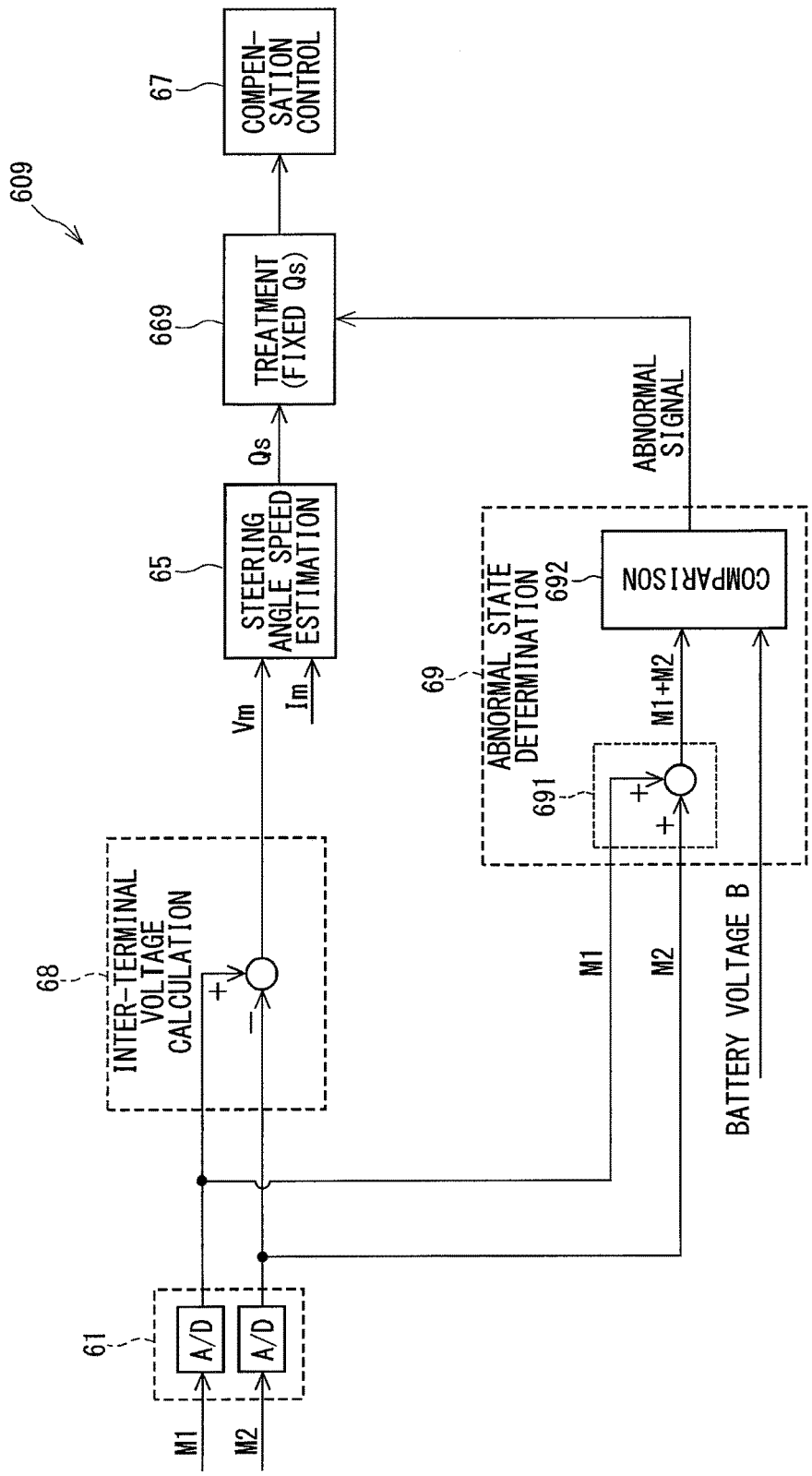

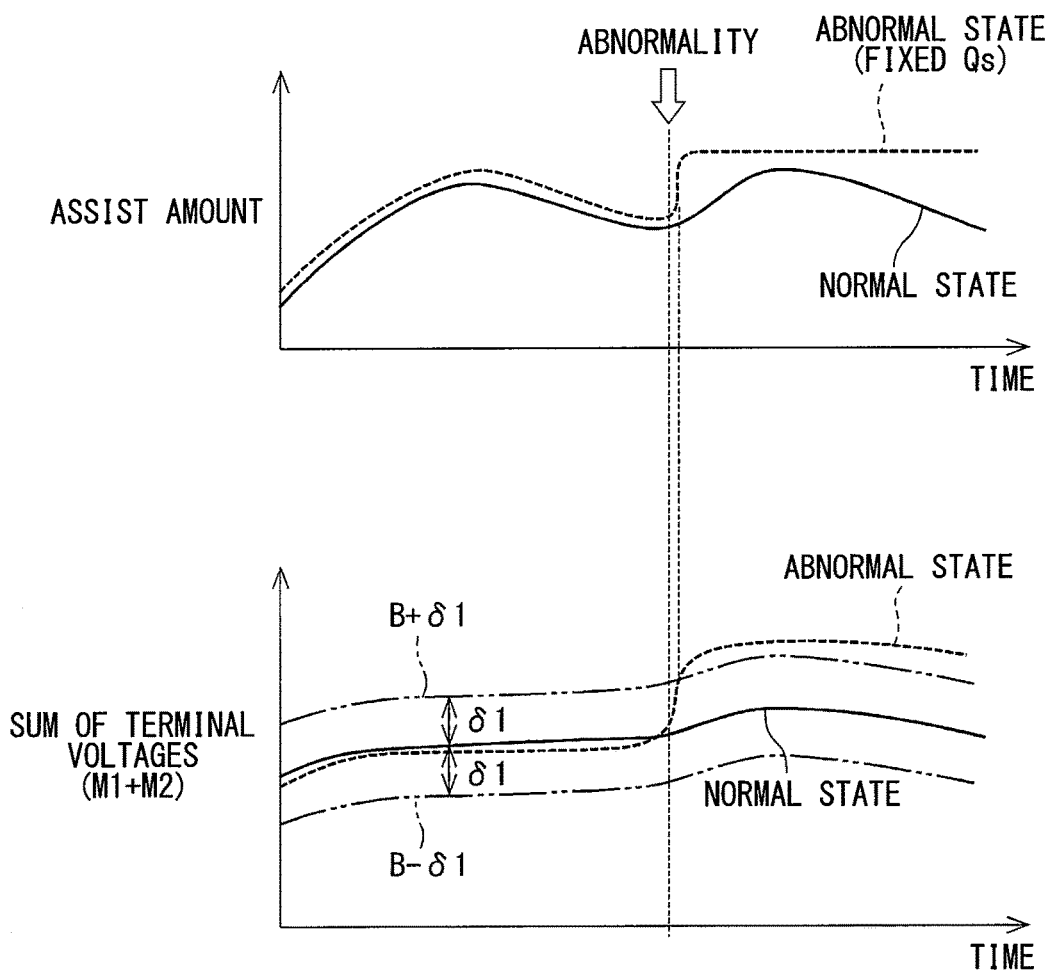
FIG. 11 COMPARATIVE EXAMPLE

FIG. 12 COMPARATIVE EXAMPLE
WITH HIGH PREDETERMINED VALUE $\delta 1$
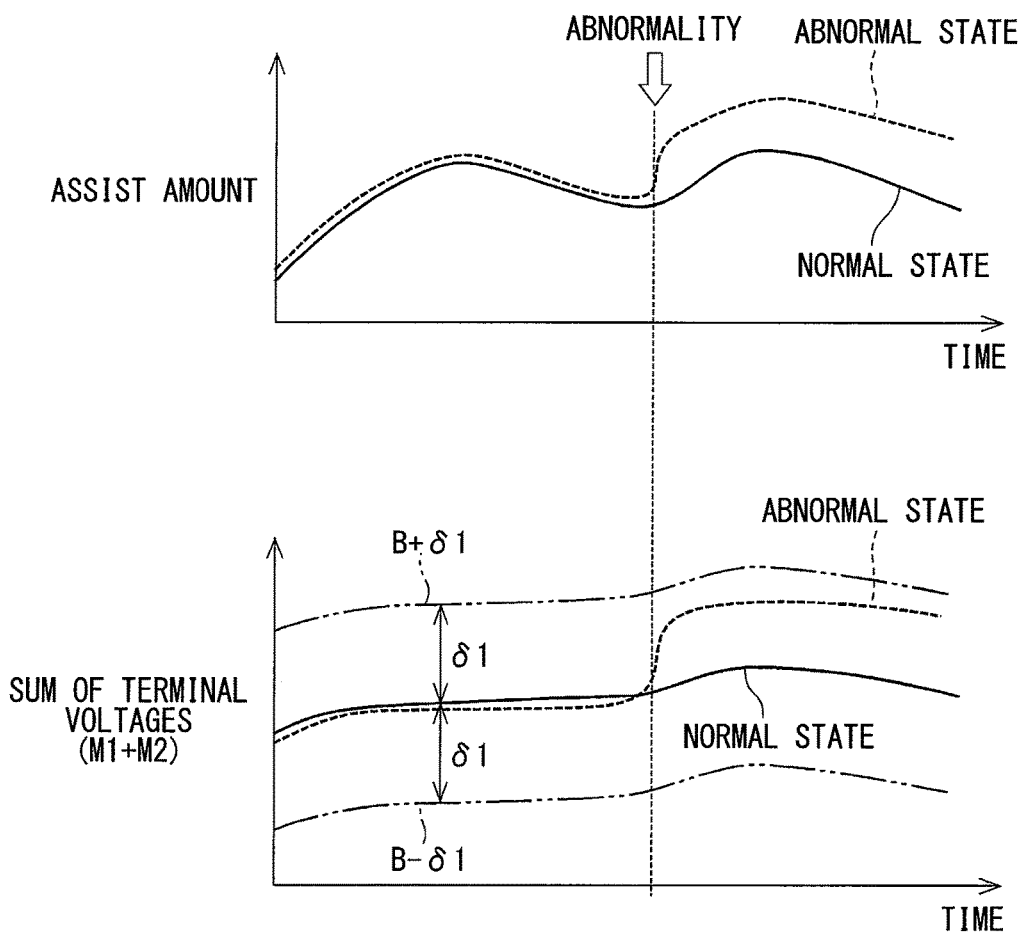

MOTOR CONTROL DEVICE

CROSS REFERENCE TO RELATED APPLICATION

This application is based on Japanese Patent Application No. 2015-246262 filed on Dec. 17, 2015, the disclosure of which is incorporated herein by reference.

TECHNICAL FIELD

The present disclosure relates to a motor control device controlling energization of a DC motor.

BACKGROUND

In a control device of a DC motor outputting assist torque for an electric power steering device, it has been conventionally known to adjust steering feeling by executing compensation control such as steering wheel return control, damper control, or friction compensation control, according to steering angle speed and vehicle speed. For example, a control device disclosed in JP2003-175850A (corresponding to US 2003/0121716) estimates steering angle speed based on voltage between terminals of a motor. The control device detects an abnormal state of terminal voltage of the motor (hereinafter, referred to as terminal voltage) based on the sum of two terminal voltages and voltage of power source. When the control device detects an abnormal state, the control device sets the steering angle speed to a fixed value and calculates a value of current of the compensation control.

SUMMARY

In JP2003-175850A, actual steering angle speed varies while the steering angle speed is fixed. Depending on the fixed value of the steering angle speed, there is a possibility that directed value larger than intended value of the compensation control is outputted with the lapse of time.

Since the necessity of fixing the steering angle speed is determined based on the determination result of the abnormal state, the compensation control will not be executed until the determination of abnormal state is finished.

Further, in JP2003-175850A, a threshold value for the determination of abnormal state is set while considering dispersion of three values, i.e., both terminal voltages and the battery voltage. When normal range is broadened to cover the dispersion, there is a possibility that the abnormal state is not detected. Especially, when the abnormal state of excess inter-terminal voltage is not detected, there is a possibility that the excess directed value is continuously outputted by the compensation control.

As described above, in JP2003-175850A, the compensation control, which employs the estimated value of the steering angle speed, is likely to be affected by the abnormal terminal voltage. That is, the control device of JP2003-175850A lacks robustness.

It is an object of the present disclosure to provide a motor control device capable of improving robustness when terminal voltage is in an abnormal state.

According to one aspect of the present disclosure, a motor control device for an electric steering device applies an inter-terminal voltage between a first terminal and a second terminal of a DC motor and controls energization of the DC motor. The DC motor generates assist torque.

The motor control device includes four bridge circuit switches, a terminal voltage detection circuit, an inter-terminal voltage calculation unit, a steering angle speed estimation unit and a compensation control unit.

The four circuit switches provide an H-bridge circuit that includes a first half bridge and a second half bridge connected in parallel to each other. The first half bridge is connected to the first terminal and the second half bridge is connected to the second terminal.

The terminal voltage detection circuit detects first detection values of a first terminal voltage of the first terminal and second detection values of a second terminal voltage of the second terminal.

The inter-terminal voltage calculation unit calculates inter-terminal voltage calculation values from the first detection values and the second detection values. The inter-terminal voltage calculation unit outputs one of the inter-terminal voltage calculation values having the smallest absolute value as an inter-terminal voltage selection value.

The steering angle speed estimation unit estimates a steering angle speed based on the inter-terminal voltage selection value and a motor current that flows in the DC motor.

The compensation control unit executes a compensation control for an assist amount of the DC motor based on the steering angle speed estimated by the steering angle speed estimation unit.

When the terminal voltage is in the abnormal state, depending on the cause of the abnormal state, there is a possibility that one inter-terminal voltage calculation value is strongly affected by the abnormal terminal voltage, and the other inter-terminal voltage calculation value is weakly affected or is not affected by the abnormal terminal voltage.

According to the one aspect of the present disclosure, in order to restrict excess assist, one of the inter-terminal voltage calculation values having the smallest absolute value is selected as the inter-terminal voltage selection value, and the steering angle speed is estimated based on the selection value. As a result, excess directed value is not outputted in the compensation control, and the assist amount similar to the normal assist amount is outputted.

Accordingly, robustness of the compensation control when the terminal voltage is in the abnormal state is improved and excess assist is restricted.

Furthermore, according to the one aspect of the present disclosure, the calculation of the inter-terminal voltage selection value is executed independently from the abnormal state determination. The compensation control is executed based on the steering angle speed estimated from the accurately selected value, regardless of the result of the abnormal state determination. As a result, according to the one aspect of the present disclosure, responsiveness of the compensation control is improved compared to a case in which the necessity of fixing the steering angle speed is determined based on the result of the abnormal state determination.

According to another aspect of the present disclosure, a motor control device for an electric steering device applies an inter-terminal voltage between a first terminal and a second terminal of a DC motor and controls energization of the DC motor. The DC motor generates assist torque.

The motor control device includes four bridge circuit switches, an inter-terminal voltage detection circuit, an inter-terminal voltage calculation unit, a steering angle speed estimation unit and a compensation control unit.

The four circuit switches provide an H-bridge circuit that includes a first half bridge and a second half bridge connected in parallel to each other. The first half bridge is connected to the first terminal and the second half bridge is connected to the second terminal.

The inter-terminal voltage detection circuit detects inter-terminal voltage detection values of the inter-terminal voltage.

The inter-terminal voltage calculation unit acquires the inter-terminal voltage detection values from the inter-terminal voltage detection circuit. The inter-terminal voltage calculation unit outputs one of the inter-terminal voltage detection values having the smallest absolute value as an inter-terminal voltage selection value.

The steering angle speed estimation unit estimates a steering angle speed based on the inter-terminal voltage selection value and a motor current that flows in the DC motor.

The compensation control unit executes a compensation control for an assist amount of the DC motor based on the steering angle speed estimated by the steering angle speed estimation unit.

When the terminal voltage is in the abnormal state, depending on the cause of the abnormal state, there is a possibility that one inter-terminal voltage detection value is strongly affected by the abnormal terminal voltage, and the other inter-terminal voltage detection value is weakly affected or is not affected by the abnormal terminal voltage.

According to the another aspect of the present disclosure, in order to restrict excess assist, one of the inter-terminal voltage detection values having the smallest absolute value is selected as the inter-terminal voltage selection value, and the steering angle speed is estimated based on the selection value. As a result, excess directed value is not outputted in the compensation control, and the assist amount similar to the normal assist amount is outputted.

Accordingly, robustness of the compensation control when the terminal voltage is in the abnormal state is improved and excess assist is restricted.

Furthermore, according to the another aspect of the present disclosure, the calculation of the inter-terminal voltage selection value is executed independently from the abnormal state determination. The compensation control is executed based on the steering angle speed estimated from the accurately selected value, regardless of the result of the abnormal state determination. As a result, according to the another aspect of the present disclosure, responsiveness of the compensation control is improved compared to a case in which the necessity of fixing the steering angle speed is determined based on the result of the abnormal state determination.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which:

FIG. 10 is a block diagram of a control calculation unit of a motor control device of a comparative example;

FIG. 11 is a diagram illustrating a behavior of the motor device of the comparative example when the terminal voltage is in an abnormal state; and FIG. 12 is a diagram illustrating a behavior of the motor device of the comparative example when the terminal voltage is in an abnormal state.

DETAILED DESCRIPTION

Figure 1:
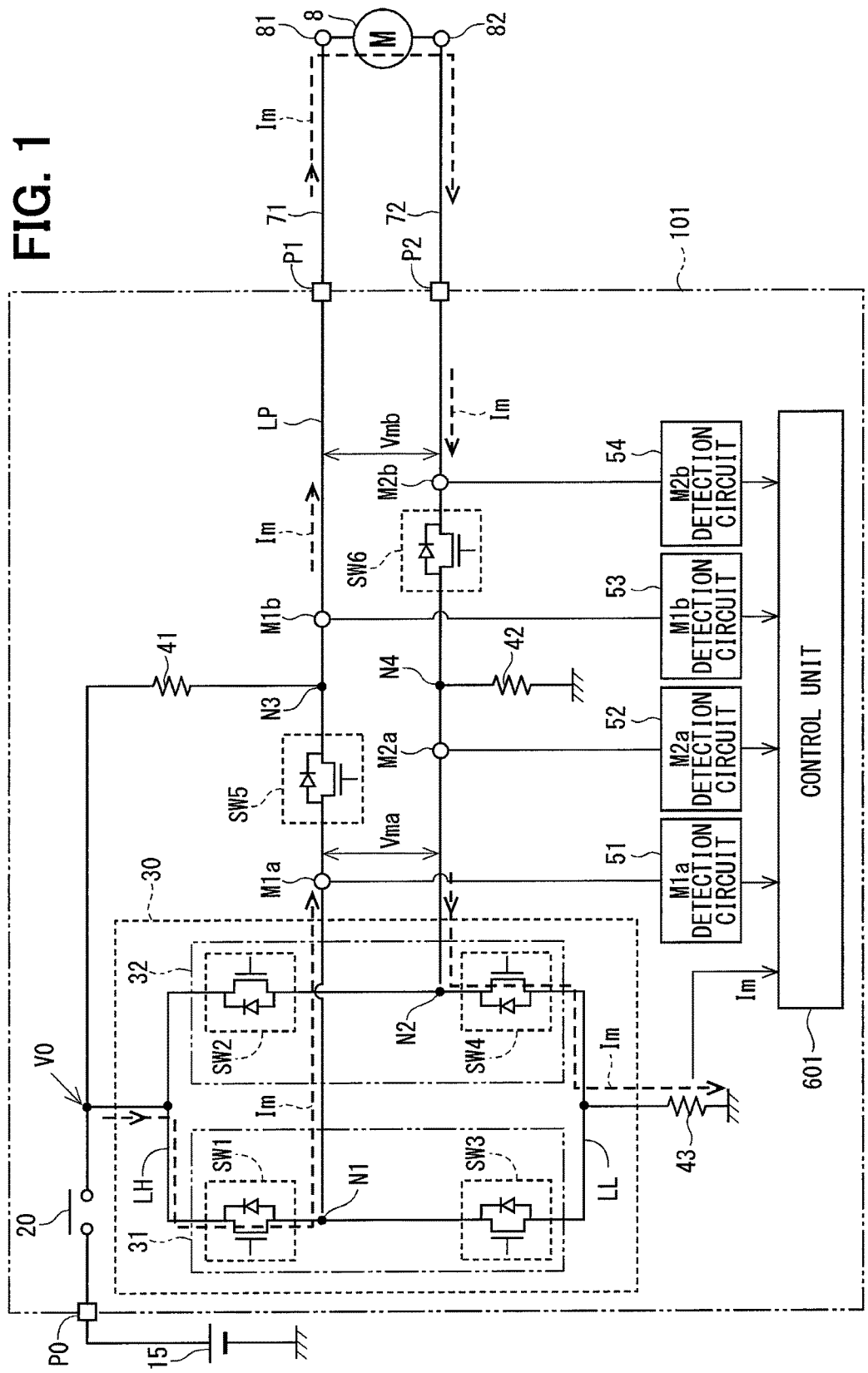
FIG. 1 is a diagram illustrating a schematic structure of a motor control device according to a first embodiment.

Hereinafter, embodiments of a motor control device of the present disclosure will be described with reference to drawings. Elements substantially the same as each other will be designed by the same symbols and descriptions thereof will not be repeated. Hereinafter, the word "present embodiments" means to include first to third embodiments.

First, an entire structure of a motor control device will be described with reference to FIG. 1.

A motor control device 101 is disposed between a battery 15 and a DC motor 8 (hereinafter, referred to as a motor). The motor control device 101 controls energization and rotating direction of the motor 8. The motor 8 of the present embodiments is employed as an assist motor that assists a steering of the driver in an electric power steering device of vehicle. The motor 8 rotates according to a steering direction of the driver. For example, when a steering wheel is rotated to right, the motor 8 rotates in positive direction. When the steering wheel is rotated to left, the motor 8 rotates in negative direction. Symbols of a steering angle speed and an assist amount are defined according to the rotation direction of the motor 8.

The motor control device 101 includes four bridge circuit switches SW1, SW2, SW3, SW4, two energization line switches SW5, SW6, terminal voltage detection circuits 51 to 54 and a control unit 601. The four bridge circuit switches SW1, SW2, SW3 and SW4 provides an H-bridge circuit 30.

The battery 15 is connected to an input port PO of the motor control device 101. When a power relay 20 is turned on, battery voltage V0 is applied to a high potential line LH of the H-bridge circuit 30.

Hereinafter, the word "switch" means a semiconductor switching element in the present disclosure. In the present embodiments, a metal-oxide semiconductor field effect transistor (MOSFET) having a parasitic diode is employed as the switch. In FIG. 1, the switch is designated by SW.

The four bridge circuit switches SW1, SW2, SW3 and SW4 provides the H-bridge circuit 30 between the high potential line LH and a low potential line LL. The H-bridge circuit 30 includes a first half bridge 31 and a second half bridge 32 connected in parallel.

The switch SW1 is an upper arm switch of the first half bridge 31. The switch SW3 is a lower arm switch of the first half bridge 31. The switch SW2 is an upper arm switch of the second half bridge 32. The switch SW4 is a lower arm switch of the second half bridge 32.

The low potential line LL of the H-bridge circuit 30 is connected to the ground through a shunt resistor 43.

Output ports. P1 and P2 of the motor control device 101 are respectively connected to a first terminal 81 and a second terminal 82 of the motor 8 through power cables 71 and 72. A first node N1 is located at a middle point of the first half bridge 31 and is connected to the first terminal 81 of the motor 8 through the output port P1. A second node N2 is located at a middle point of the second half bridge 32 and is connected to the second terminal 82 of the motor 8 through the output port P2. An energization line LP is a current path connecting the first node N1 and the second node N2 through the motor 8.

Two energization line switches SW5 and SW6 are disposed on the energization line LP in a direction in which the parasitic diodes face each other and are connected in series with each other through the motor 8. The energization line switches SW5 and SW6 function as a motor relay capable of interrupting the energization line LP between the H-bridge circuit 30 and the motor 8.

A third node N3 is located between the energization line switch SW5 and the first terminal 81 of the motor 8 on the energization line LP. A pull-up resistor 41 is connected between the high potential line LH and the third node N3.

The energization line switch SW6 is located between a fourth node N4 and the second terminal 82 of the motor 8 on the energization line LP. A pull-down resistor 42 is connected between the fourth node N4 and the ground.

If explanations of PWM control, dead time or the like are omitted and an operation of the motor control device 101 is simply described, the bridge circuit switches SW1 and SW4 are turned on with a positive rotation of the motor 8. The energization line switch SW5 is turned off and the energization line switch SW6 is turned on with the positive rotation of the motor 8. In this case, a motor current Im flows in order from the switch SW1 to the switch SW4 through the first node N1, the parasitic diode of the switch SW5, the motor 8, the switch SW6 and the second node N2. The parasitic diode of the energization line switch SW5 blocks reverse current in the energization line LP (i.e., current flows from the second node N2 to the first node N1).

In FIG. 1, a current path of the motor current Im in the positive rotation of the motor 8 is shown by broken lines.

The bridge circuit switches SW2 and SW3 are turned on with a negative rotation of the motor 8. The energization line switch SW5 is turned on and the energization line switch SW6 is turned off with the negative rotation of the motor 8. In this case, a motor current Im flows in order from the switch SW2 to the switch SW3 through the second node N2, the parasitic diode of the switch SW6, the motor 8, the switch SW5 and the first node N1. The parasitic diode of the energization line switch SW6 blocks reverse current in the energization line LP (i.e., current flows from the first node N1 to the second node N2).

Accordingly, ON/OFF of the energization line switches SW5 and SW6 are switched according to the rotation direction of the motor 8, and the reverse current is prevented from flowing in the motor 8.

In the present embodiments, the shunt resistor 43 detects the motor current Im in the energization state. In the other embodiments, the shunt resistor 43 may be omitted, and the motor current Im may be detected by a current sensor disposed on the energization line LP.

A control unit 601 of the motor control device 101 controls the output of the motor 8 by controlling time period of ON/OFF of the bridge circuit switches SW1 to SW4 (i.e., by controlling duty of the bridge circuit switches SW1 to SW4). Since a control of the DC motor in a normal operation state is well-known, in the present disclosure, detailed description thereof and illustration of the related input/output signals will be omitted. Regarding the structure of the control unit 601, parts relating to an estimating calculation of the steering angle speed, which is described later, will be mainly described.

Next, characteristic structure of the present embodiments relating to the detection of the terminal voltage will be described.

When resistances of elements, connection terminals, or wirings on the energization line LP are excluded, in the normal operation state, the voltage of the energization line LP is the same from the first node N1 to the first terminal 81. Hereinafter, the voltage from the first node N1 to the first terminal 81 will be referred to as a first terminal voltage M1. Also, the voltage of the energization line LP is the same from the second node N2 to the second terminal 82. Hereinafter, the voltage from the second node N2 to the second terminal 82 will be referred to as a second terminal voltage M2. A voltage difference between the first terminal voltage M1 and the second terminal voltage M2 will be referred to as an inter-terminal voltage Vm.

The motor control device 101 of the first embodiment includes four terminal voltage detection circuits 51 to 54 that respectively detect the first terminal voltage M1 and the second terminal voltage M2 at two places on the energization line LP.

The terminal voltage detection circuit 51 detects a first terminal voltage M1$a$ of a place between the energizaiton line switch SW5 and the H-bridge circuit 30. The terminal voltage detection circuit 52 detects a second terminal voltage M2$a$ of a place between the energizaiton line switch SW6 and the H-bridge circuit 30.

The terminal voltage detection circuit 53 detects a first terminal voltage M1$b$ of a place between the energizaiton line switch SW5 and the motor 8. The terminal voltage detection circuit 54 detects a second terminal voltage M2$b$ of a place between the energizaiton line switch SW6 and the motor 8.

That is, in the first embodiment, two values of the terminal voltage are detected respectively for the first terminal voltage M1 and the second terminal voltage M2 at the places between the energizaiton line switch SW5 and the H-bridge circuit 30, between the energizaiton line switch SW6 and the H-bridge circuit 30, between the energizaiton line switch SW5 and the motor 8 and between the energizaiton line switch SW6 and the motor 8. The voltage detection by the terminal voltage detection circuits 51 to 54 may be executed in any form, such as a method employing voltage dividing resistance.

Hereinafter, the terminal voltage will be designated by three letters to distinguish the first terminal voltages M1 and the second terminal voltages M2. The third letter is determined based on the number of the detection values in an alphabetical order like a, b and c. When the detection values are not identified, the detection values will be designated as M1# or M2#. The inter-terminal voltage Vm will be designated in the similar manner.

The control unit 601 acquires the motor current Im detected by the shunt resistor 43, the first detection values M1$a$, M1$b$ and the second detection values M2$a$, M2$b$ detected by the terminal voltage detection circuits 51 to 54.

Next, detailed structure of the control unit 601 will be described with reference to FIG. 2. The control unit 601 includes an AD conversion unit 61, an inter-terminal voltage calculation unit 62, an abnormal state determination unit 64, a steering angle speed estimation unit 65, a treatment unit 66 and a compensation control unit 67.

The AD conversion unit 61 converts the analog signals of the first detection values M1# and the second detection values M2#, which are acquired from the terminal voltage detection circuits 51 to 54, into digital signals. The AD conversion unit 61 may include AD converters corresponding to the terminal voltages and concurrently convert the terminal voltages. Conversely, the AD conversion unit 61 may include a common AD converter and convert the terminal voltages sequentially. In the other embodiments, the terminal voltage detection circuits may output digital signals.

The inter-terminal voltage calculation unit 62 includes a subtracter 621 and a voltage value selection unit 622.

The subtracter 621 calculates two inter-terminal voltage calculation values Vma_cal and Vmb_cal from formulas (1.1) and (1.2).

$$Vma\_cal = M1a - M2a \quad (1.1)$$

$$Vmb\_cal = M1b - M2b \quad (1.2)$$

The voltage value selection unit 622 selects one calculation value having smaller absolute figure from the two inter-terminal voltage calculation values Vma_cal and Vmb_cal. The voltage value selection unit 622 outputs the one calculation value as an inter-terminal voltage selection value Vm_sel. When the symbols of the two inter-terminal voltage calculation values Vma_cal and Vmb_cal are different, the voltage value selection unit 622 outputs 0 as the inter-terminal voltage selection value Vm_sel. Details will be described later with reference to FIG. 3, FIG. 4A and FIG. 4B.

The abnormal state determination unit 64 includes a subtracter 641 and a threshold comparison unit 642.

The subtracter 641 calculates a first deviation $\Delta M1$ and a second deviation $\Delta M2$ from formulas (2.1), (2.2) using the first detection values M1$a$, M1$b$ and the second detection values M2$a$, M2$b$.

$$\Delta M1 = |M1a - M1b| \quad (2.1)$$

$$\Delta M2 = |M2a - M2b| \quad (2.1)$$

The threshold comparison unit 642 compares each of the deviations $\Delta M1$ and $\Delta M2$ with a predetermined determination threshold value $\Delta Mth$. When both of the deviations $\Delta M1$ and $\Delta M2$ are equal to or smaller than the determination threshold value $\Delta Mth$, the abnormal state determination unit 64 determines that the terminal voltage is in the normal state. Conversely, when at least one of the deviations $\Delta M1$ and $\Delta M2$ is larger than the determination threshold value $\Delta Mth$, the abnormal state determination unit 64 determines that the terminal voltage is in the abnormal state, and outputs an abnormal signal to the treatment unit 66.

The determination threshold value $\Delta Mth$ is set to the maximum value of the voltage range in which the determination threshold value $\Delta Mth$ likely to vary due to the detection error of the terminal voltage detection circuits, wiring resistance and the like. When the deviation $\Delta M1$ or $\Delta M2$ is larger than the determination threshold value $\Delta Mth$, there is a possibility that some trouble occurs between two detection places. For example, in the first embodiment, there is a possibility that open fault occurs in the energization line switch SW5 or SW6 connected between two detection places on the energization line LP.

The steering angle speed estimation unit 65 acquires the inter-terminal voltage selection value Vm_sel, which is calculated by the inter-terminal voltage calculation unit 62, and the motor current Im, which is detected by the shunt resistor 43.

A voltage equation of the motor 8 is expressed by formula (3.1).

$$Vm = K\varphi \times N - R \times Im \quad (3.1)$$

In the formula (3.1), $K\varphi$ represents a back electromotive force constant, N represents a rotation number of motor and R represents a motor resistance.

When the formula (3.1) is rearranged to make the rotation number N the subject, formula (3.2) is obtained.

$$N = (Vm + R \times Im) / K\varphi \quad (3.2)$$

The steering angle speed estimation unit 65 substitutes the inter-terminal voltage selection value Vm_sel for Vm in the formula (3.2) to calculate the rotation number N. Further, the steering angle speed estimation unit 65 multiplies the rotation number N by gear ratio to estimate a steering angle speed Qs. According to the formula (3.2), an absolute value of the estimated value of the steering angle speed Qs increases as the absolute value of the inter-terminal voltage Vm increases. The steering angle speed Qs estimated by the steering angle speed estimation unit 65 is outputted to the compensation control unit 67.

The compensation control unit 67 executes compensation control of the amount of the assist of the motor 8 based on the steering angle speed Qs outputted from the steering angle speed estimation unit 65. The compensation control includes the steering wheel return control, the damper control and the friction compensation control, which are disclosed in JP2003-175850. Detailed description of the compensation control will be omitted in the present disclosure.

Basically, the compensation control is proportionated to the steering angle speed Qs. That is, an absolute value of the assist amount of the compensation control increases as the absolute value of the inter-terminal voltage Vm increases.

The treatment unit 66 executes the abnormal state treatment when the treatment unit 66 receives the abnormal signal from the abnormal state determination unit 64. As shown by a broken line in FIG. 2, for example, the treatment unit 66 may control the compensation control unit 67 to halt or restrict a part of or entire compensation control according to a type or degree of the abnormal state. The treatment unit 66 may notify the driver of the abnormal state by, for example, illuminating a warning lamp.

Next, the inter-terminal voltage calculation processing executed by the inter-terminal voltage calculation unit 62 will be described with reference to the flowchart of FIG. 3, and FIG. 4A and FIG. 4B. In the following descriptions of the flowchart, S means a step of processing. This processing is repeatedly executed during the operation of the motor control device 101.

At S11, the subtracter 621 calculates two inter-terminal voltage calculation values Vma_cal and Vmb_cal from the above formulas (1.1) and (1.2).

The voltage value selection unit 622 executes the processing from S12 to S16.

At S12, it is determined whether the symbols of the two calculation values Vma_cal and the Vmb_cal are the same. When one of the symbols of the calculation values Vma_cal and the Vmb_cal is positive and the other is negative (S12: NO), the processing proceeds to S13. At S13, the voltage value selection unit 622 outputs 0 as the inter-terminal voltage selection value Vm_sel.

When both of the symbols of the calculation values Vma_cal and the Vmb_cal are positive or negative (S12: YES), the processing proceeds to S14.

Technical purpose of the determination of symbols at S12 will be described with reference to FIG. 4A and FIG. 4B. In FIG. 4A and FIG. 4B, relations between the actual value of the inter-terminal voltage and the calculation values Vma_cal, Vmb_cal are illustrated in a broken line and a dashed-dotted line. In FIG. 4A, the inter-terminal voltage selection value Vm_sel with the determination of symbols is shown by a bold solid line. In FIG. 4B, the inter-terminal voltage selection value Vm_sel without the determination of symbols is shown by a bold solid line. In the following third embodiment, the inter-terminal voltage calculation value of the vertical axis is changed to the inter-terminal voltage detection value.

The two calculation values Vma_cal and Vmb_cal have different gradients with respect to the actual value of Vm. Magnitude relationship of the calculation values reverses at one point. That is, there is a range in which the symbols of the calculation values are different (i.e., symbols-different range). In the processing shown in FIG. 4B, one of the calculation values having smaller absolute value is selected regardless of the symbols. Therefore, the inter-terminal voltage selection value Vm_sel varies discontinuously at actual value X in which Vma_cal is equal to −Vmb_cal. When the compensation control is executed based on the steering angle speed Qs estimated from such a discontinuously varying inter-terminal voltage selection value Vm_sel, there is a possibility that the steering feeling is affected.

Figure 4A:
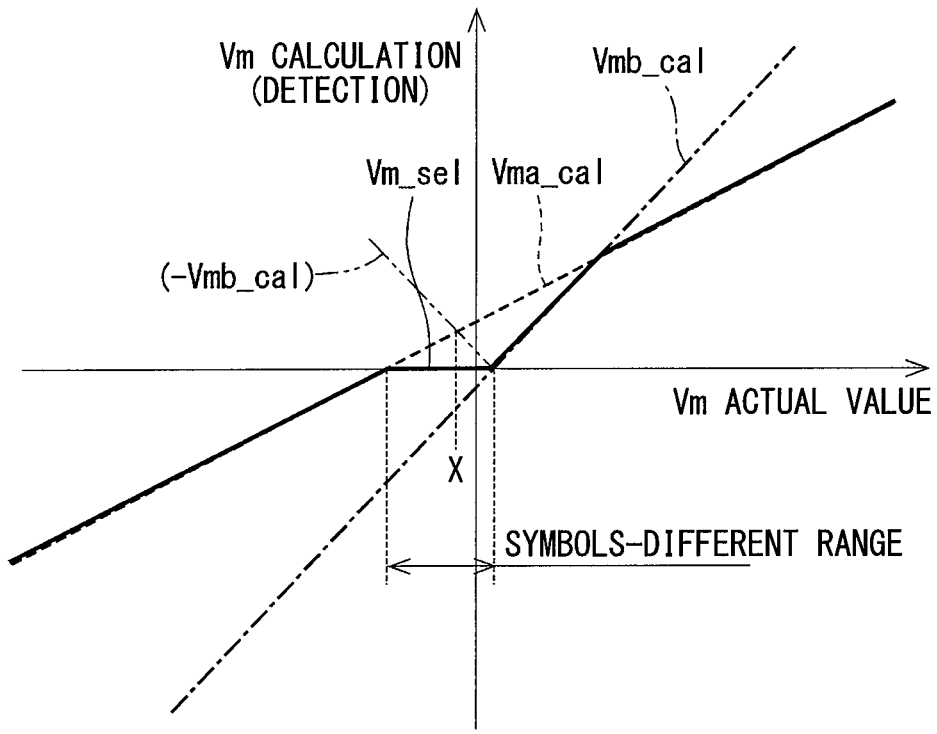
FIG. 4A and FIG. 4B are diagrams for explaining setting of selection value of the inter-terminal voltage based on symbols of calculation values of the inter-terminal voltage or detection values of the inter-terminal voltage.

On the other hand, in the processing shown in FIG. 4A, the inter-terminal voltage selection value Vm_sel is set to 0 within the range in which the symbols of the calculation values Vma_cal and Vmb_cal are different. As such, the inter-terminal voltage selection value Vm_sel varies continuously according to the actual value Vm of the inter-terminal voltage. As a result, excellent steering feeling is maintained by the compensation control based on the steering angle speed Qs estimated from the selection value Vm_sel of the inter-terminal voltage.

Figure 3:
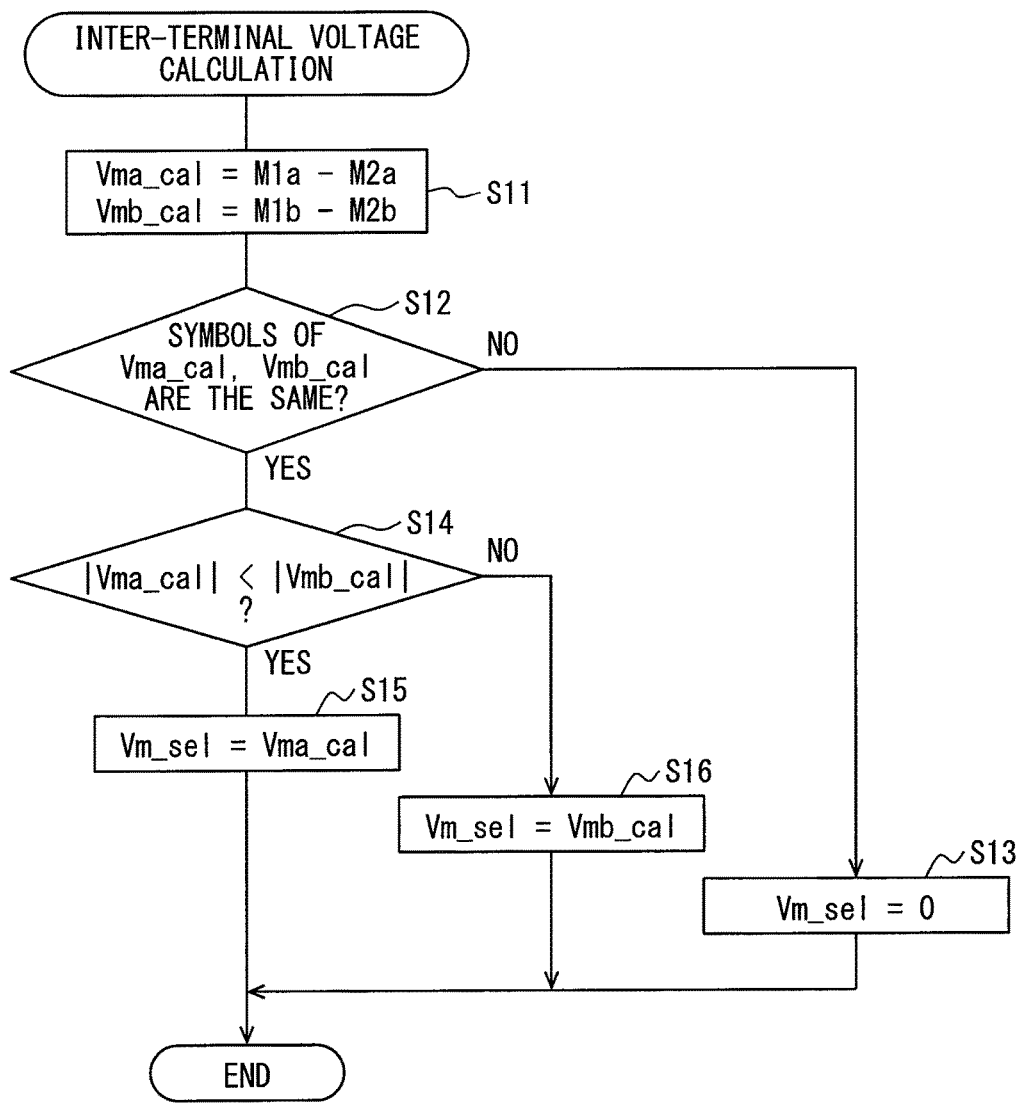
FIG. 3 is a flowchart illustrating an inter-terminal voltage calculation according to the first embodiment.
Figure 4B:
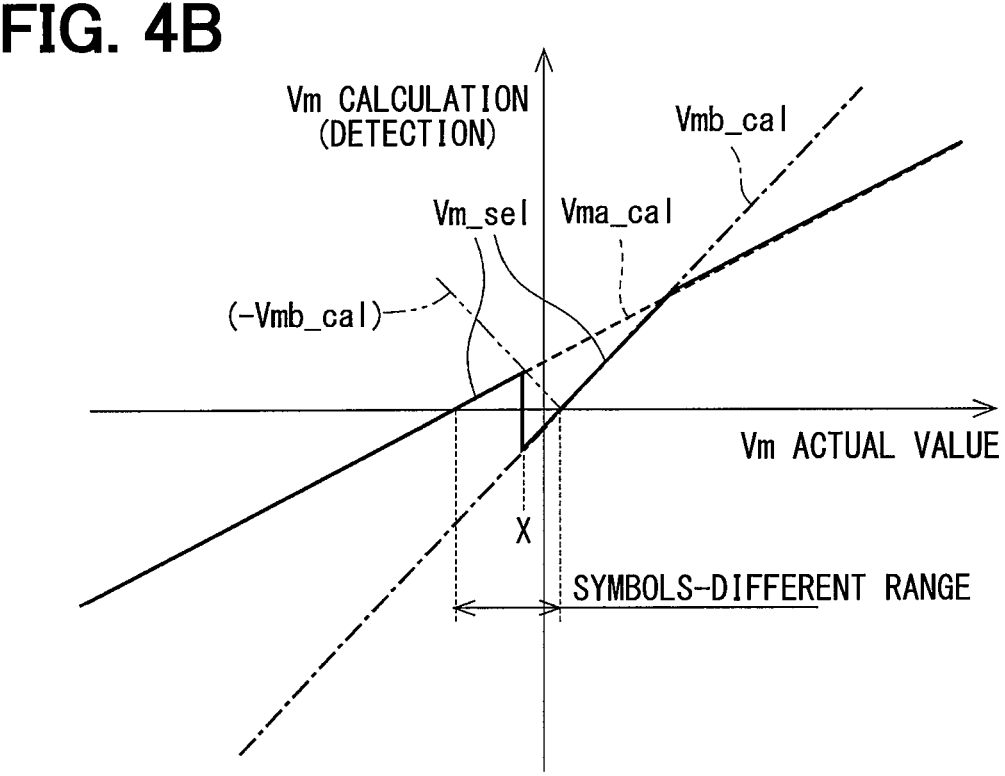

Next, at S14 to S16 of FIG. 3, the voltage value selection unit 622 compares absolute values of two calculation values Vma_cal and Vmb_cal, selects and outputs one of the calculation values having smaller absolute value as the selection value Vm_sel of the inter-terminal voltage.

For example, at S14 of FIG. 3, it is determined whether |Vma_cal|<|Vmb_cal|. When the |Vma_cal| is smaller than |Vmb_cal|, S14 is determined as YES and the Vma_cal is selected as the selection value Vm_sel at S15. When the |Vma_cal| is equal to or larger than |Vmb_cal|, S14 is determined as NO and the Vmb_cal is selected as the selection value Vm_sel at S16. When the Vma_cal is equal to Vmb_cal in the minimum unit of resolution performance, either calculation value may be selected.

Hereinabove, the inter-terminal voltage calculation processing is finished.

Figure 5:
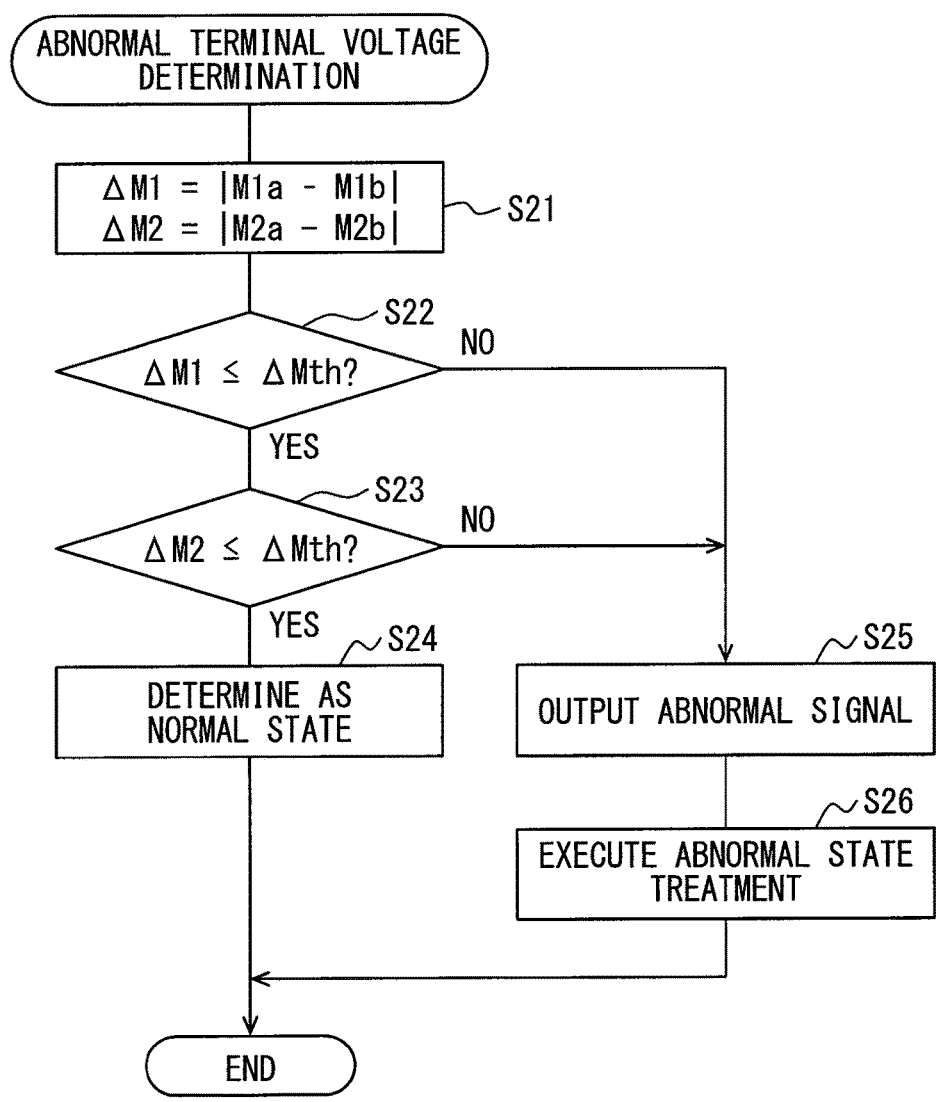
FIG. 5 is a flowchart illustrating an abnormal state determination of the terminal voltages according of the first embodiment.

Next, the abnormal terminal voltage determination processing executed by the abnormal state determination unit 64 will be described with reference to FIG. 5.

At S21, the subtracter 641 calculates the first deviation $\Delta M1$ and the second deviation $\Delta M2$ from the above formulas (2.1), (2.2) using the first detection values M1a, M1b and the second detection values M2a, M2b.

At S22, the threshold comparison unit 642 determines whether the first deviation $\Delta M1$ is equal to or smaller than the determination threshold value $\Delta$ Mth. At S23, the threshold comparison unit 642 determines whether the second deviation $\Delta M2$ is equal to or smaller than the determination threshold value $\Delta$Mth. When the first deviation $\Delta M1$ is equal to or smaller than the determination threshold value $\Delta$Mth (S22: YES) and the second deviation $\Delta M2$ is equal to or smaller than the determination threshold value $\Delta$Mth (S23: YES), the processing proceeds to S24. At S24, the abnormal state determination unit 64 determines that the terminal voltage is in the normal state and finishes the processing.

On the other hand, when at least one of the first deviation $\Delta M1$ and the second deviation $\Delta M2$ is larger than the determination threshold value $\Delta$Mth, i.e., at least one of S22 and S23 is determined as NO, the processing proceeds to S25. At S25, the abnormal state determination unit 64 outputs the abnormal signal to the treatment unit 66. At S26, the treatment unit 66 that receives the abnormal signal executes the abnormal state treatment.

Hereinabove, the abnormal terminal voltage determination processing is finished.

(Effects)

(1) Effects of the present embodiments including the following second embodiment and third embodiment will be described by being compared with a comparative example. The structure and operation of the comparative example will be described with reference to FIG. 10 to FIG. 11. In the control unit 609 of the comparative example shown in FIG. 10, the elements substantially similar to the first embodiment will be designated by the same symbols as the first embodiment.

In the comparative example, one value is detected for each of the first terminal voltage M1 and the second terminal voltage M2. The inter-terminal voltage calculation unit 68 calculates one inter-terminal voltage Vm by subtracting the second terminal voltage V2 from the first terminal voltage M1. The inter-terminal voltage calculation unit 68 outputs the inter-terminal voltage Vm to the steering angle speed estimation unit 65. The steering angle speed estimation unit 65 estimates the steering angle speed Qs based on the inter-terminal voltage Vm and the motor current Im.

When the terminal voltage is in the normal state, the compensation control unit 67 executes the compensation control based on the estimated steering angle speed Qs.

The abnormal state determination unit 69 includes an accumulater 691 and a comparator 692. The accumulater 691 calculates the sum (M1+M2) of the first terminal voltage M1 and the second terminal voltage M2. The comparator 692 compares the sum of the terminal voltages (M1+M2) with maximum/minimum threshold values. The maximum/minimum threshold values are equal to (battery voltage B±predetermined value δ1). When the sum of the terminal voltages (M1+M2) is larger than the maximum threshold value or when the sum of the terminal voltages (M1+M2) is smaller than the minimum threshold value, the abnormal state determination unit 69 determines that the terminal voltage is in the abnormal state, and outputs the abnormal signal to the treatment unit 669.

When the treatment unit 669 receives the abnormal signal, the treatment unit 669 fixes the steering angle speed Qs to the predetermined value. When the terminal voltage is in the abnormal state, the compensation control unit 67 executes the compensation control based on the fixed steering angle speed Qs. That is, in the comparative example, necessity of fixing the steering angle speed Qs is determined according to the determination result of the abnormal state. The compensation control will not be executed until the abnormal state determination finishes.

Behaviors of the motor control device of the comparative example in which the terminal voltage is in the abnormal state will be described with reference to FIG. 11 and FIG. 12.

The assist amount in FIG. 11 and FIG. 12 means the assist amount provided by the compensation control executed based on the estimated value of the steering angle speed Qs. The assist amount varies over time according to, for example, the variation of the steering torque by the user. The sum of the terminal voltages also varies over time according to the variation of the battery voltage. An abnormality is assumed to occur in the terminal voltage at a timing shown by a white arrow in the FIG. 11 and FIG. 12.

In the comparative example, the values equal to (battery voltage B predetermined value δ1) are employed as the threshold value for the sum of the terminal voltages (M1+M2). Since the object of the present disclosure is to restrict the excess assist, the following description focuses on the maximum threshold value, i.e., (battery voltage B+predetermined value δ1). The minimum threshold value, i.e., (battery voltage B−predetermined value δ1) is illustrated only for reference.

As shown in FIG. 11, the predetermined value δ1 for the abnormal state determination is set to relatively low value. When the sum of the terminal voltages (M1+M2) increases due to the abnormal state, the sum exceeds the maximum threshold value and the abnormal terminal voltage is detected. In such a case, the steering angle speed Qs is fixed and constant assist amount is outputted.

However, the actual steering angle speed varies while the steering angle speed Qs for the compensation control is fixed. Depending on the fixed value of the steering angle speed Qs, there is a possibility that the directed value of the assist amount larger than an intended value of the compensation control is outputted with the lapse of time. The excess assist amount lowers the steering feeling. Also, there is a possibility that malfunction occurs at another place due to, for example, fever caused by excess current.

In the comparative example, the predetermined value δ1 for the determination of the abnormal state is set while considering dispersion of three values, i.e., both terminal voltages and the battery voltage. When the predetermined value δ1 is set to relatively high value considering the dispersion, as shown in FIG. 12, the sum of the terminal voltage (M1+M2) increases due to the abnormal state, but does not exceed the maximum threshold value. As a result, abnormal terminal voltage is not detected. Is such a case, the compensation control is executed based on the steering angle speed Qs estimated from the inter-terminal voltage Vm calculated from the abnormal terminal voltages M1 and M2. As a result, there is a possibility that excess assist amount more than required assist amount is outputted.

In conclusion, in the comparative example, the compensation control, which employs the estimated value of the steering angle speed, is likely to be affected by the abnormal terminal voltage. That is, the motor control device of the comparative example lacks robustness.

Figure 6:
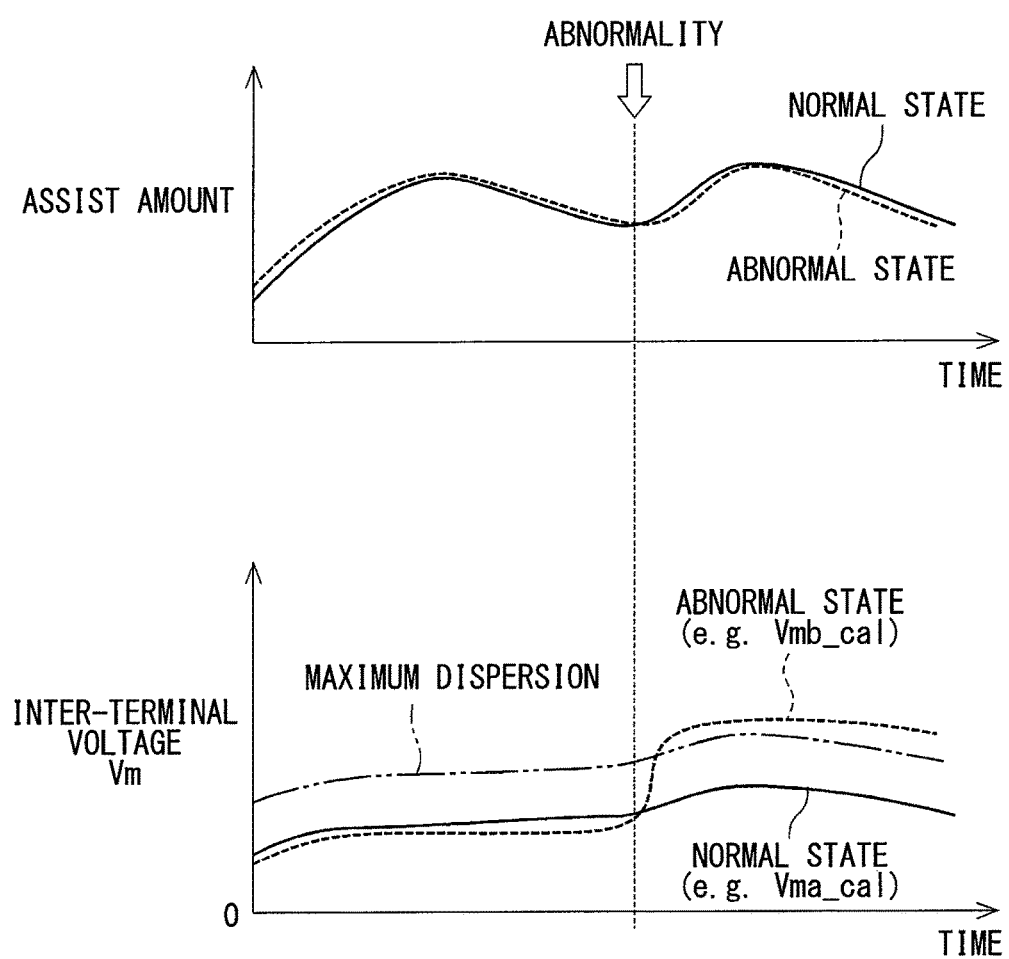
FIG. 6 is a diagram illustrating a behavior of the motor control device according to the first embodiment when the terminal voltages are in the abnormal state.

In contrast to the above comparative example, behavior of the motor control device of the present embodiments when the terminal voltage is in the abnormal state will be described with reference to FIG. 6. In FIG. 6, time-dependent change of the inter-terminal voltage Vm will be illustrated instead of the sum of the terminal voltages (M1+M2) of FIG. 11 and FIG. 12. In the present embodiments, although the inter-terminal voltage Vm itself is not compared with the determination threshold value, the maximum dispersion of the inter-terminal voltage Vm will be illustrated for the comparison with the maximum threshold value of the comparative example.

In the present embodiments, among the inter-terminal voltage values, one inter-terminal voltage value having the smallest absolute value is selected as the inter-terminal voltage selection value Vm_sel, and the steering angle speed Qs is estimated based on the selection value Vm_sel.

Especially in the first embodiment, among the calculation values Vm#_cal calculated from the first detection values M1# and the second detection values M2# detected at multiple places, one calculation value having the smallest absolute value is selected as the selection value Vm_sel. In the following third embodiment, the inter-terminal voltage detection value corresponds to the inter-terminal voltage calculation value described in the effects of the first embodiment.

When the terminal voltage is in the abnormal state, depending on the cause of the abnormal state, there is a possibility that one inter-terminal voltage calculation value is strongly affected by the abnormal terminal voltage, and the other inter-terminal voltage calculation value is weakly affected or is not affected by the abnormal terminal voltage. For example, in FIG. 6, the Vma_cal is a normal value that is not affected by the abnormal terminal voltage, and the Vmb_cal is an abnormal value that is affected by the abnormal terminal voltage.

In the present embodiments, in order to restrict excess assist, one of the inter-terminal voltage calculation values having the smallest absolute value is selected as the inter-terminal voltage selection value Vm_sel, and the steering angle speed Qs is estimated based on the selection value Vm_sel. In FIG. 6, the Vma_cal having smaller absolute value is selected and the steering angle speed Qs is calculated. As a result, excess directed value is not outputted in the compensation control, and the assist amount similar to the normal assist amount is outputted.

Accordingly, robustness of the compensation control when the terminal voltage is in the abnormal state is improved and excess assist is restricted.

Furthermore, in the present embodiments, the calculation of the inter-terminal voltage selection value Vm_sel is executed independently from the abnormal state determination. The compensation control is executed based on the steering angle speed Qs estimated from the accurately selected value Vm_sel, regardless of the result of the abnormal state determination. As a result, in the present embodiments, responsiveness of the compensation control is improved compared to the comparative example in which the necessity of fixing the steering angle speed Qs is determined based on the result of the abnormal state determination.

(2) In the present embodiments, when the symbols of the two calculation values Vma_cal and Vmb_cal of the inter-terminal voltage are different, the inter-terminal voltage calculation unit 62 sets the selection value Vm_sel of the inter-terminal voltage to 0. As such, the selection value Vm_sel of the inter-terminal voltage varies continuously according to the variation of the actual value Vm of the inter-terminal voltage and the continuousness of the inter-terminal voltage is secured. As a result, excellent steering feeling is maintained in the compensation control based on the steering angle speed Qs estimated from the selection value Vm_sel of the inter-terminal voltage.

(3) In the first embodiment and the following second embodiment, when at least one of the first deviation ΔM1 and the second deviation ΔM2 is larger than the determination threshold value ΔMth, the abnormal state determination unit 64 determines that the terminal voltage is in the abnormal state and outputs the abnormal signal to the treatment unit 66. As such, the abnormal terminal voltage is detected even when the influence of the abnormal terminal voltage for the detection value varies depending to the conditions of the detection places.

In the comparative example, the threshold value for the determination of abnormal state is set while considering dispersion of three values of both terminal voltages and the battery voltage. When normal range is broadened to cover the dispersion, there is a possibility that the abnormal state is not detected. Especially, when the abnormal state of excess value of the inter-terminal voltage is not detected, there is a possibility that the excess directed value is continuously outputted by the compensation control.

Conversely, in the first embodiment and the second embodiment, the determination threshold value ΔMth is set while considering the detection error in the first detection values M1# among the first terminal voltage or the detection error in the second detection values M2# among the second terminal voltage. The determination threshold value ΔMth is set accurately. That is, performance detecting the abnormal state is improved.

As described above, in the present embodiments, the compensation control is executed based on the steering angle speed Qs estimated from the accurately selected value Vm_sel of the inter-terminal voltage, regardless of the result of the abnormal state determination. The excess directed value is restricted from being outputted regardless of the setting of the threshold value for the abnormal state determination.

(4) In the first embodiment and the second embodiment, the first detection values M1a, M1b and the second detection values M2a, M2b are detected at the places between the energization line switch SW5 and the H-bridge circuit 30, between the energization line switch SW6 and the H-bridge circuit 30, between the energization line switch SW5 and the motor 8 and between the energization line switch SW6 and the motor 8. As such, when the open failure occurs in the energization line switch SW5 or SW6, the abnormal state determination unit 64 detects the abnormal terminal voltage.

Second Embodiment

Next, the second embodiment will be described with reference to FIG. 7.

A motor control device 102 of the second embodiment includes terminal voltage detection circuits 55 and 56 in addition to the terminal voltage detection circuits 51 to 54 of the first embodiment. The terminal voltage detection circuit 55 detects the first terminal voltage M1c adjacent to the first terminal 81 of the motor 8. The terminal voltage detection circuit 56 detects the second terminal voltage M2c adjacent to the second terminal 82 of the motor 8. The detection values M1c and M2c are inputted to the terminal voltage detection circuits 55 and 56 through the signal cables 73 and 74 connected to the detection ports P3 and P4 of the motor control device 102.

Figure 2:
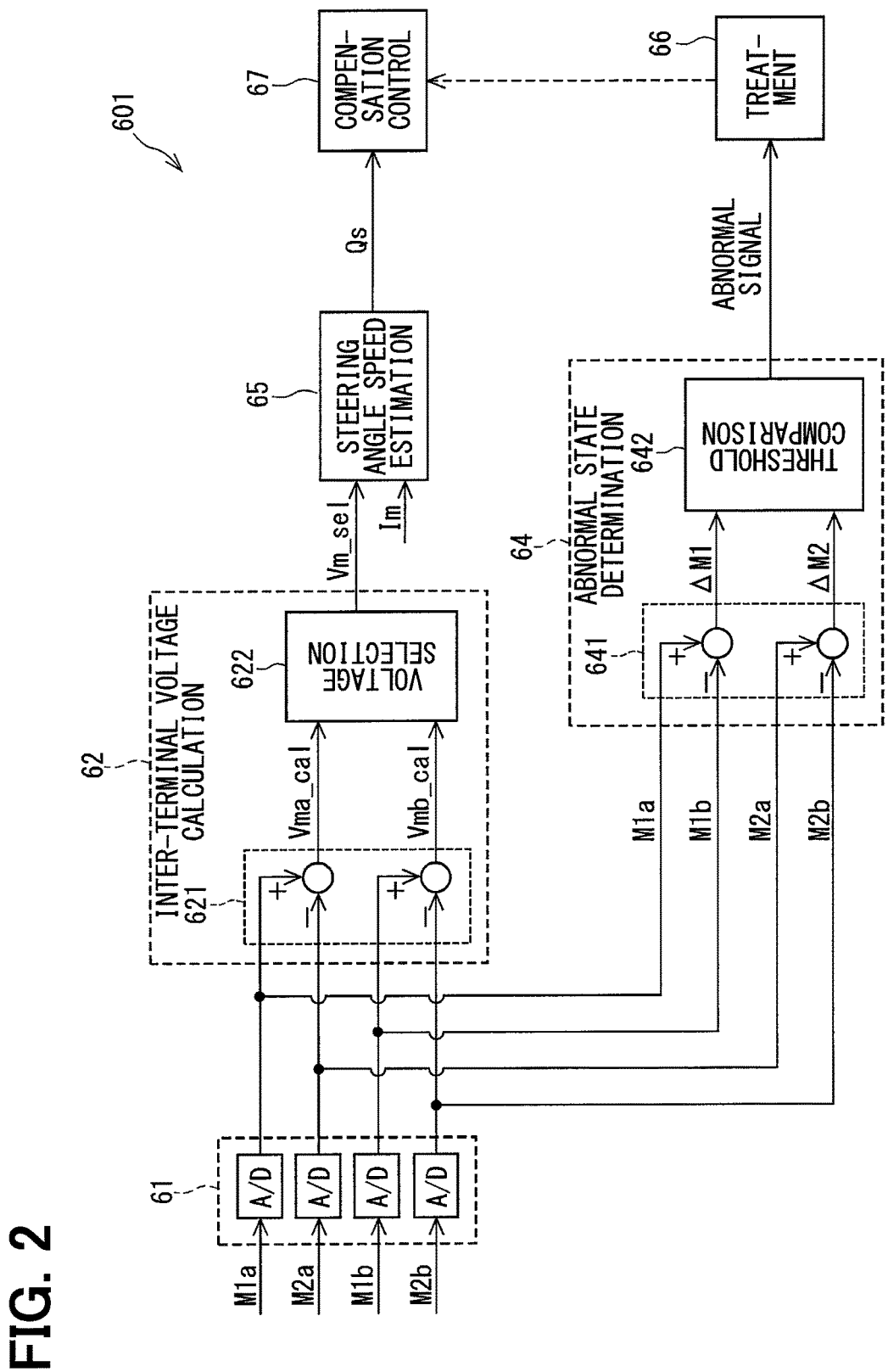
FIG. 2 is a block diagram of a control calculation unit of the motor control device according to the first embodiment.

The structure of the control unit 602 of the second embodiment is obtained by adding the third inputs of the detection values M1c and M2c to FIG. 2 of the first embodiment. Since the structure of the control unit 602 is achieved from FIG. 2, illustration thereof will be omitted. By referring to a part of FIG. 2, in the control unit 602, the first detection values M1a, M1b, M1c and the second detection values M2a, M2b, M2c are converted to digital signals in the AD conversion unit 61 and are acquired by the inter-terminal voltage calculation unit 62.

Based on the acquired six detection values M1a, M1b, M1c, M2a, M2b and M2c, the inter-terminal voltage calculation unit 62 calculates three calculation values Vma_cal, Vmb_cal and Vmc_cal. The Vmc_cal is equal to M1c–M2c. The inter-terminal voltage calculation unit 62 selects and outputs one of the calculation values having smallest absolute value as the inter-terminal voltage selection value Vm_sel. In the case of |Vma_cal|<|Vmb_cal|≈|Vmc_cal|, the inter-terminal voltage calculation unit 62 selects the Vma_cal as the selection value Vm_sel.

The selection of the inter-terminal voltage of the second embodiment is different from well-known majority method.

When the symbol of at least one of the calculation values Vma_cal, Vmb_cal and Vmc_cal is different from the others, the inter-terminal voltage calculation unit 62 sets the selection values Vm_sel to 0. In other words, only when all of the symbols of the calculation values Vma_cal, Vmb_cal and Vmc_cal are the same as each other, the absolute values are compared and the one of the calculation values having the smallest absolute value is selected.

The subtracter 641 of the abnormal state determination unit 64 calculates the deviations ΔM1 and ΔM2 respectively from two of three first detection values M1a, M1b, M1c and two of three second detection values M2a, M2b, M2c. For example, regarding the first terminal voltage, the subtracter 641 calculates three deviations ΔM1 between M1a and M1b, between M1b and M1c, and between M1c and M1a.

When at least one of the deviations ΔM1 and ΔM2, which are calculated by the subtracter 641, is larger than the determination threshold value ΔMth, the threshold comparison unit 642 determines that the terminal voltage is in the abnormal state, and outputs the abnormal signal to the treatment unit 66.

In the second embodiment, the inter-terminal voltage calculation and the terminal voltage abnormal state determination are executed based on the detection values M1c and M2c, which are detected adjacent to the motor 8 through the power cables 71 and 72, in addition to the detection values M1a, M1b, M2a, M2b of the terminal voltage, which are detected in the motor control device 102.

As such, the second embodiment achieves the similar effects to the first embodiment. Additionally, in the second embodiment, the abnormal state is detected even when the power cables 71 and 72 are disconnected and influence to the estimation of the steering angle speed Qs is reduced.

As a modification of the second embodiment, the first terminal voltage M1 and the second terminal voltage M2 may be detected at four or more places. For example, when elements or connection terminals other than the energization line switches SW5 and SW6 are disposed on the energization line LP, the terminal voltages are detected at both ends of the elements or the connection terminals. As such, abnormal state is detected even when the abnormal state such as open failure or disconnection occurs in the elements or the connection terminal.

Third Embodiment

Next, a third embodiment will be described with reference to FIG. 8 and FIG. 9.

Figure 8:
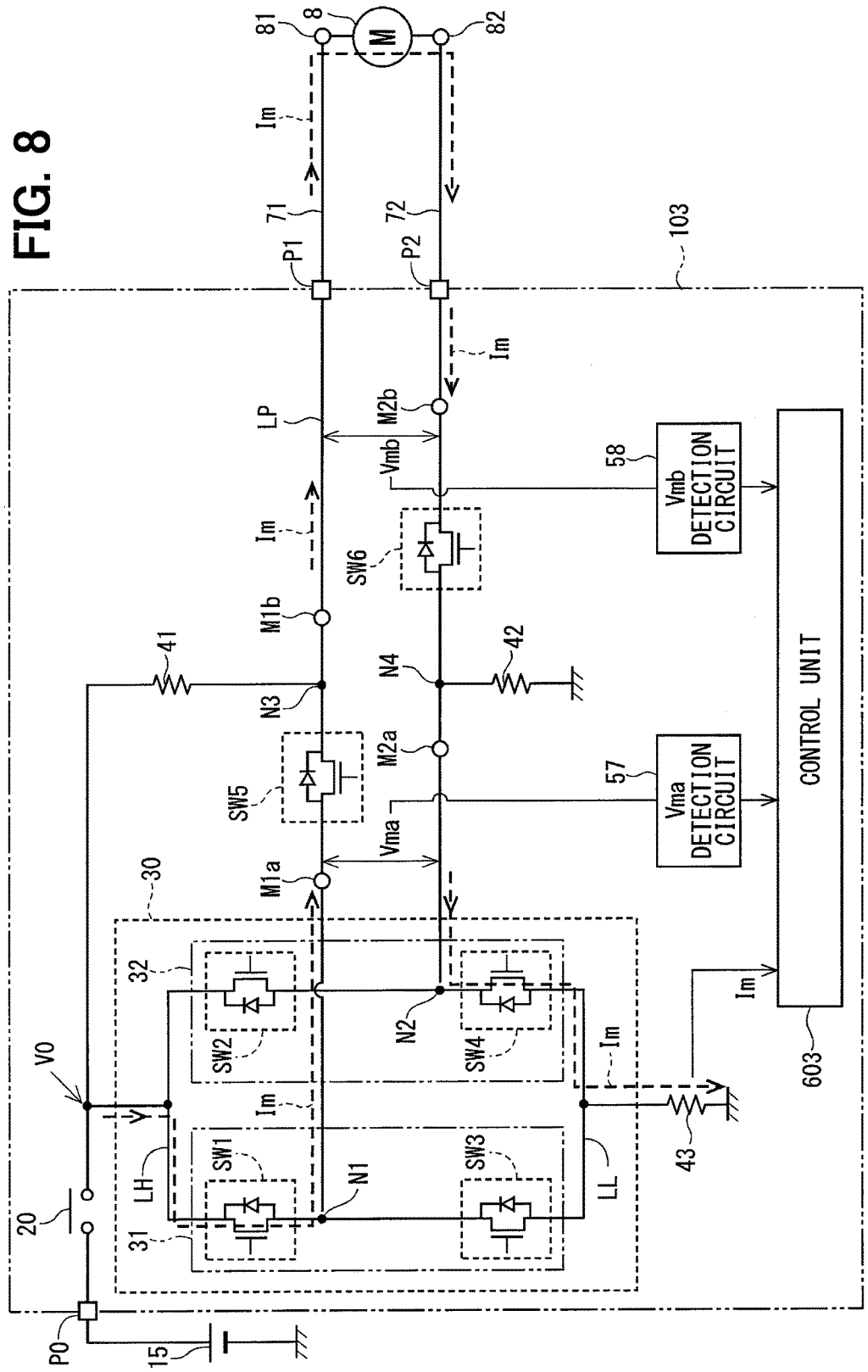
FIG. 8 is a diagram illustrating a schematic structure of a motor control device according to a third embodiment.

As shown in FIG. 8, a motor control device 103 of the third embodiment includes inter-terminal voltage detection circuits 57 and 58. The inter-terminal voltage detection circuits 57 and 58 do not individually detect the first terminal voltage M1 and the second terminal voltage M2, as the first embodiment. The inter-terminal voltage detection circuits 57 and 58 directly detect the inter-terminal voltage Vm. The inter-terminal voltage detection circuit 57 detects the inter-terminal voltage Vma between the first terminal voltage M1a and the second terminal voltage M2a at a place between the H-bridge circuit 30 and the energization line switches SW5, SW6. The inter-terminal voltage detection circuit 58 detects the inter-terminal voltage Vmb between the first terminal voltage M1b and the second terminal voltage M2b at a place between the motor 8 and the energization line switches SW5, SW6.

Figure 9:
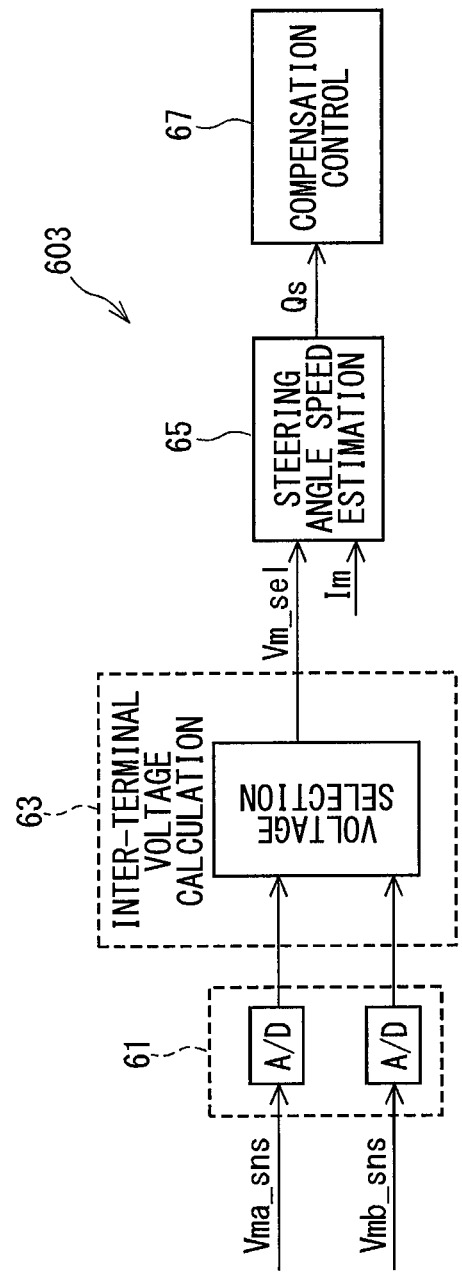
FIG. 9 is a block diagram of a control calculation unit of the motor control device according to the third embodiment.

As shown in FIG. 9, in the control unit 603, the AD conversion unit 61 converts the detection values Vma_sns, Vmb_sns of the inter-terminal voltage into digital signals, and the inter-terminal voltage calculation unit 63 acquires the detection values Vma_sns and Vmb_sns. The inter-terminal voltage calculation unit 63 selects and outputs one of the detection values Vma_sns and Vmb_sns having smaller absolute value as the inter-terminal voltage selection value Vm_sel. When the symbols of the detection values Vma_sns and Vmb_sns are different, the inter-terminal voltage calculation unit 63 sets the selection value Vm_sel to 0.

The control unit 603 of the third embodiment does not include the abnormal state determination unit and the treatment unit, and only executes the inter-terminal voltage calculation. Also in the third embodiment, effects similar to (1) and (2) of the first embodiment are achieved.

As a modification of the third embodiment, the inter-terminal voltage Vm may be detected at three or more places on the energization line LP. For example, similarly to the second embodiment, the inter-terminal voltage may be detected at a place adjacent to the first terminal 81 and the second terminal 82 of the motor 8.

In such a case, the inter-terminal voltage calculation unit 63 outputs one of the three or more detection values Vm#_sns having the smallest absolute value as the selection value Vm_sel. When the symbol of at least one of the three or more detection values Vm#_sns is different from the others, the inter-terminal voltage calculation unit 63 sets the selection value Vm_sel to 0.

Other Embodiments (a) In the first and the second embodiments, the first detection values M1# and the second detection values M2# of the first terminal voltage and the second terminal voltage are detected at multiple places on the energization line LP. In the other embodiments, a part of or all of the first detection values M1# and the second detection values M2# are detected at the same place.

In such a case, for example, the detection values are converted to the digital signals by the different AD converters. As such, the abnormal state is detected even when some of the AD converters have malfunction. Logics of the voltage detection may be changed depending on the detection values of the terminal voltage.

Figure 7:
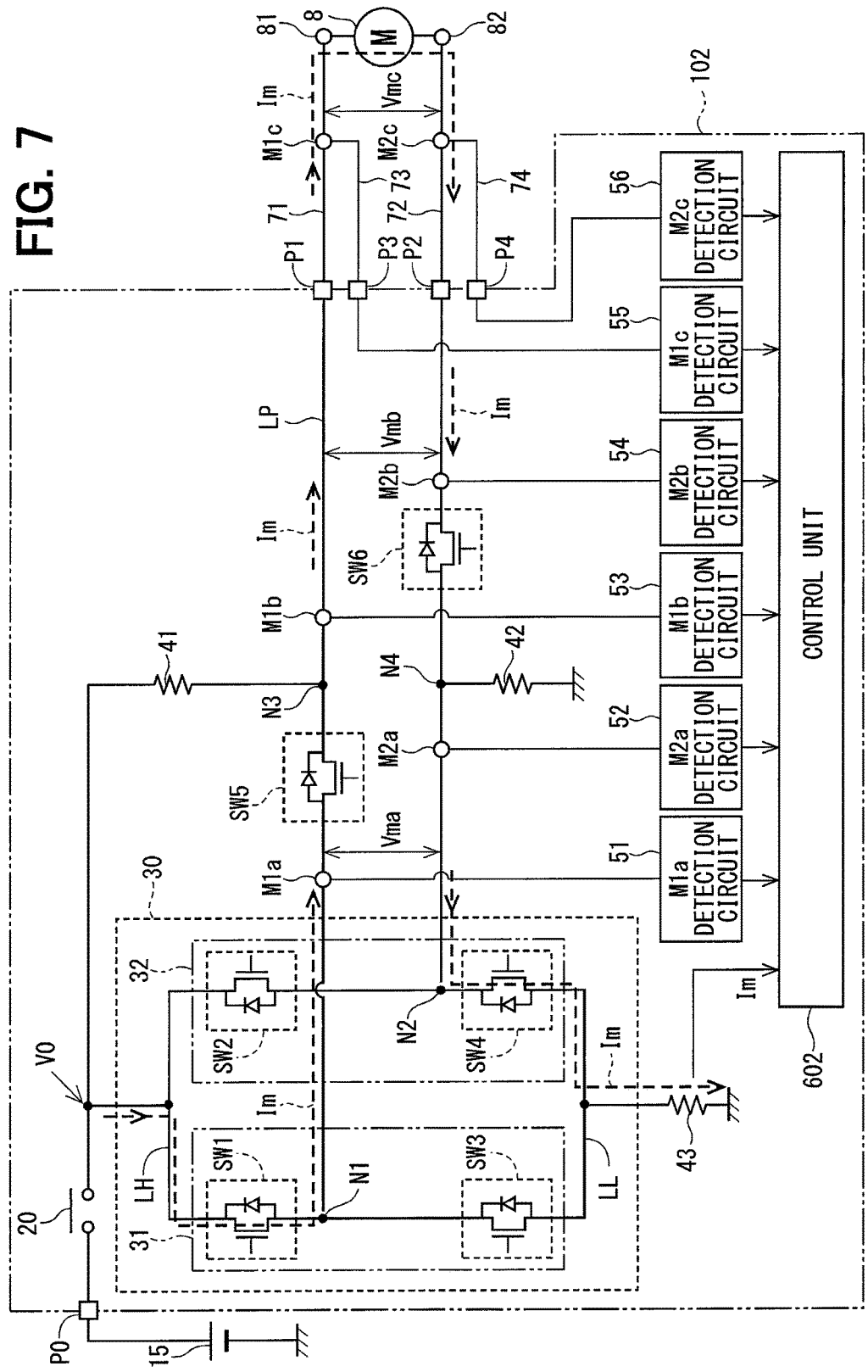
FIG. 7 is a diagram illustrating a schematic structure of a motor control device according to a second embodiment.

(b) In FIG. 1, FIG. 7 and FIG. 8 of the above embodiments, the terminal voltage detection circuits 51 to 56 and the inter-terminal voltage detection circuits 57 and 58 are described individually. However, a part of functions of the detection circuits may be commonly applied for the detection values. The number of the terminal voltage detection circuit and the inter-terminal voltage detection circuit are not limited to more than one.

(c) As the four bridge circuit switches SW1, SW2, SW3, SW4, a field effect transistor other than MOSFET or a transistor such as IGBT may be employed. When a transistor without a parasitic diode is employed, freewheel diode connected in parallel between a collector and an emitter may be assumed as the parasitic diode.

While only the selected exemplary embodiment and examples have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiment and examples according to the present disclosure is provided for illustration only, and not for the purpose of limiting the disclosure as defined by the appended claims and their equivalents.

What is claimed is:

1. A motor control device for an electric power steering device applying an inter-terminal voltage between a first terminal and a second terminal of a DC motor that generates an assist torque and controlling an energization of the DC motor, the motor control device comprising:
    four bridge circuit switches providing an H-bridge circuit that includes a first half bridge and a second half bridge connected in parallel to each other, the first half bridge being connected to the first terminal, and the second half bridge being connected to the second terminal;
    an inter-terminal voltage detection circuit detecting a plurality of detection values of the inter-terminal voltage;
    an inter-terminal voltage calculation unit acquiring the plurality of detection values from the inter-terminal voltage detection circuit, and outputting one of the plurality of detection values having a smallest absolute value as an inter-terminal voltage selection value;
    a steering angle speed estimation unit estimating a steering angle speed based on the inter-terminal voltage selection value and a motor current that flows in the DC motor; and
    a compensation control unit executing a compensation control for an assist amount of the DC motor based on the steering angle speed estimated by the steering angle speed estimation unit, wherein
    the first half bridge has a first node,
    the second half bridge has a second node,
    the first node is connected to the first terminal and the second node is connected to the second terminal to provide an energization line connecting the first node and the second node through the DC motor,
    the energization line includes a first energization line between the first node and the first terminal,
    the energization line includes a second energization line between the second node and the second terminal,
    the inter-terminal voltage is a voltage difference between a first terminal voltage of the first energization line and a second terminal voltage of the second energization line, and
    the plurality of detection values of the inter-terminal voltage includes values detected at two or more different places across the first energization line and the second energization line.

2. The motor control device according to claim 1, wherein the inter-terminal voltage calculation unit sets the inter-terminal voltage selection value to be zero when a positive or negative sign associated with at least one of the plurality of detection values is different from a positive or negative sign associated with another one of the plurality of detection values.

3. The motor control device according to claim 1, further comprising:
an energization line switch that is configured to connect and disconnect the energization line, wherein
the energization line switch is disposed on at least one of a place between the first node and the first terminal on the energization line and a place between the second node and the second terminal on the energization line, and
the plurality of detection values of the inter-terminal voltage include two values detected at a place between the H-bridge circuit and the energization line switch on the energization line and a place between the DC motor and the energization line switch on the energization line.

4. The motor control device according to claim 1, wherein:
the plurality of detection values of the inter-terminal voltage includes a first detection value and a second detection value,
the first detection value of the inter-terminal voltage is a voltage difference between the first terminal voltage detected at one place on the first energization line and the second terminal voltage detected at one place on the second energization line, and
the second detection value of the inter-terminal voltage is a voltage difference between the first terminal voltage detected at another place on the first energization line and the second terminal voltage detected at another place on the second energization line.

5. The motor control device according to claim 4, further comprising:
a first energization line switch disposed on the first energization line and is configured to connect and disconnect the first energization line; and
a second energization line switch disposed on the second energization line and is configured to connect and disconnect the second energization line, wherein
the first detection value of the inter-terminal voltage is a voltage difference between the first terminal voltage detected at a place between the first node and the first energization line switch and the second terminal voltage detected at a place between the second node and the second energization line switch, and
the second detection value of the inter-terminal voltage is a voltage difference between the first terminal voltage detected at a place between the first energization line switch and the first terminal and the second terminal voltage detected at a place between the second energization line switch and the second terminal.

* * * * *